United States Patent [19]

Mc Vey et al.

[11] Patent Number: 5,624,772
[45] Date of Patent: Apr. 29, 1997

[54] BATTERY HANDLE

[75] Inventors: Harry D. Mc Vey, Pendleton; Roger L. Huxhold, Indianapolis; John F. Burk, Anderson, all of Ind.

[73] Assignee: General Motors Corporation, Detroit, Mich.

[21] Appl. No.: 560,067

[22] Filed: Nov. 17, 1995

[51] Int. Cl.$^6$ .................................................. H01M 2/10
[52] U.S. Cl. ........................................ 429/187; 16/114 R
[58] Field of Search ................................. 429/187, 175, 429/176; 16/114 R, DIG. 15

[56] References Cited

U.S. PATENT DOCUMENTS

| | | | |
|---|---|---|---|
| 2,440,170 | 4/1948 | Duefrene | 16/114 R |
| 4,029,248 | 6/1977 | Lee | 429/187 X |
| 4,673,625 | 6/1987 | McCartney et al. | 429/187 |
| 5,232,796 | 8/1993 | Baumgartner | 429/187 |

*Primary Examiner*—Stephen Kalafut
*Attorney, Agent, or Firm*—Lawrence B. Plant

[57] ABSTRACT

Battery and attachable/detachable carrying handle therefor having restricted detachability including a knob on the battery container and a terminal on the end of the handle for engaging the knob. The knob includes a longitudinally bilaterally truncated cylindrical stem having opposed flat faces and a flange extending radially outward from the stem. The terminal includes a wall defining a pocket for the flange and a socket for the stem. The socket includes a narrow slot-like gate having an opening which is slightly less than the distance between the flat faces on the stem. The flange is sufficiently large as to completely overlie the slot-like gate throughout at least about 180° of rotation of the handle about the knob.

3 Claims, 2 Drawing Sheets

BATTERY HANDLE

This invention relates to detachable handles for electric storage batteries and more particularly to handles having restricted detachability.

BACKGROUND OF THE INVENTION

SLI batteries such as are typically used in automotive, marine, recreational or other applications are heavy, cumbersome, and often must be placed in tight confines or remote locations in a vehicle or storage facility. The desirability of providing such batteries with attachable/detachable handles for facilitating carrying, placement and retrieval of such batteries has long been known and a variety of designs have been proposed. One such design is shown in U.S. Pat. No. 4,673,625 issued Jun. 16, 1987. Such a handle has been used commercially and has been very effective for the normal carrying and handling of the batteries. However, an end of the handle is undesirably susceptible to detachment from the battery when the handle is pulled sideways (i.e., perpendicular to the end face of the battery) as may occur, for example, when pulling a battery out of a storage rack thereof.

SUMMARY OF THE INVENTION

The present invention is an improvement on the design handle described in U.S. Pat. No. 4,673,625, and is adapted to (1) prevent such undesirable detaching, and (2) restrict the direction in which the handle can be removed from the battery. More specifically, the present invention comprehends an electric storage battery having a handle which (1) is attachable/detachable to the battery by displacement in only one direction parallel to the endwalls of the battery, (2) can pivot between a carrying position above the battery to a storage position alongside the battery, and (3) can resist detachment from the battery when pulled in a direction perpendicular to the endwall. A mounting knob projects from each of the opposite endwalls of the battery container, and comprises a stem and a flange extending radially outboard the stem by a first length. An inner surface on the underside (stem-side) of the flange confronts the endwall of the container to which the knob is attached by the stem. The stem comprises a longitudinally, bilaterally truncated cylinder having a pair of opposing arcuate faces spaced apart by a first distance and a pair of opposing flat faces spaced apart by a second distance which is less than the first distance. The handle comprises a central gripping portion and arm portions which extend from the opposite ends of the gripping portion to terminals on the ends thereof which engage the mounting knobs on the ends of the arms. Each terminal comprises a wall which lies inboard its associated arm adjacent the container endwall, and defines a pocket for receiving the flange of the knob. When coupled to the knob, the wall of the terminal engages the inner surface on the underside of the flange and together therewith prevents axial displacement of the terminal with respect to the knob (i.e., perpendicular to the endwall). A large surface area of contact is provided between the terminal wall and the inner surface of the flange to resist pulling off of the terminal. A rim of the wall defines a socket in the wall which receives and retains the knob's stem. The socket comprises a stem-retention zone, and a gate for the ingress and egress of the stem into and out of the stem-retention zone. The gate is a slot in the wall which is slightly narrower (i.e., an interference fit) than the second distance between the flat faces on the stem to prevent the stem from exiting the stem-retention zone under normal conditions of use yet permit manual snapping of the stem into and out of the retention-zone when so desired. The slot has a second length which is at least about equal to the first length of the flange. The diameter of the flange is such that it completely overlies the slot throughout at least about 180° of rotation of the handle from both of its horizontal positions (i.e., from the 9 o'clock position to the 3 o'clock position of the handle). The flat faces on the stem limit the directions in which the handle can be removed, and preferably are oriented substantially vertically so that the handle can only be removed by pushing the terminal vertically downwardly.

BRIEF DESCRIPTION OF THE DRAWINGS

The invention will better be understood when considered in the light of the following detailed description thereof which is given hereafter in conjunction with the several drawings in which.

DETAILED DESCRIPTION OF THE INVENTION

Figure 1:
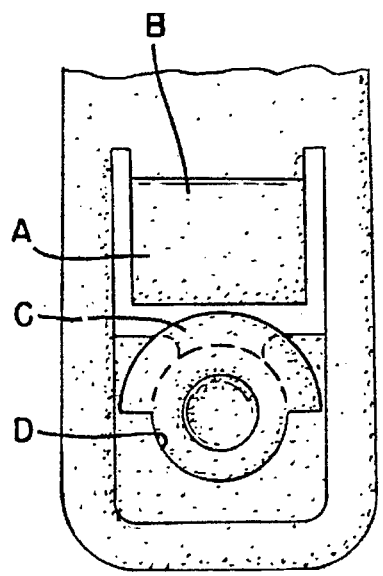
FIG. 1 illustrates a prior art terminal for a detachable battery carrying handle.
Figure 2:
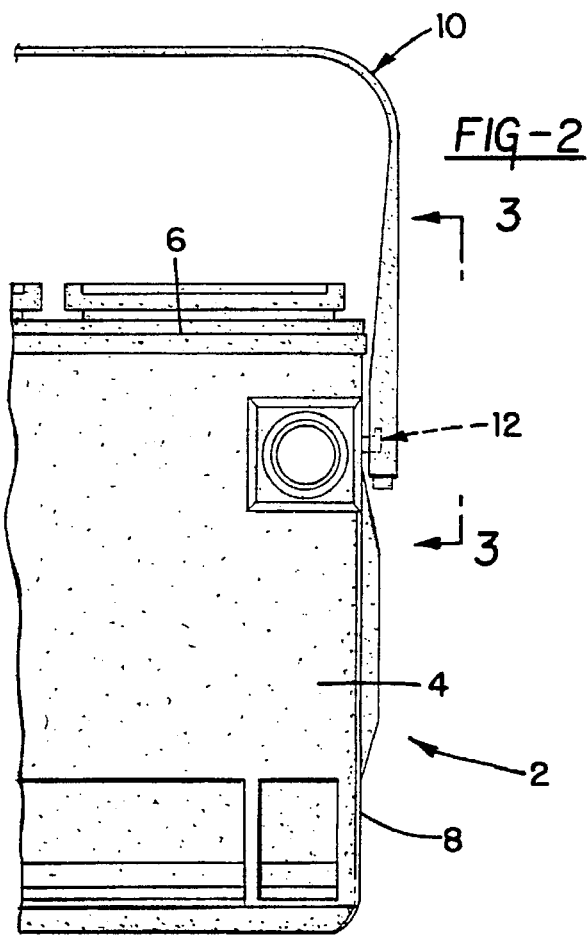
FIG. 2 is a partial elevational view of the endwall of a battery and handle attached thereto.
Figure 3:
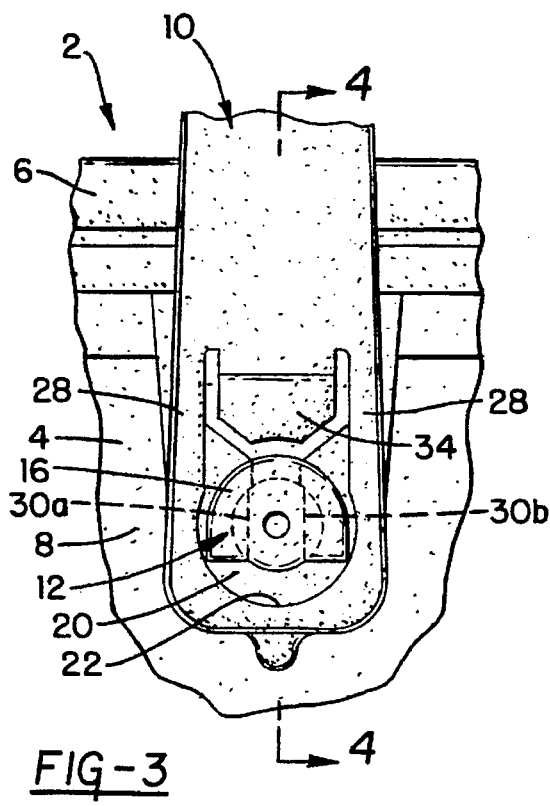
FIG. 3 is an elevational view in the direction 3—3 of FIG. 2.
Figure 4:
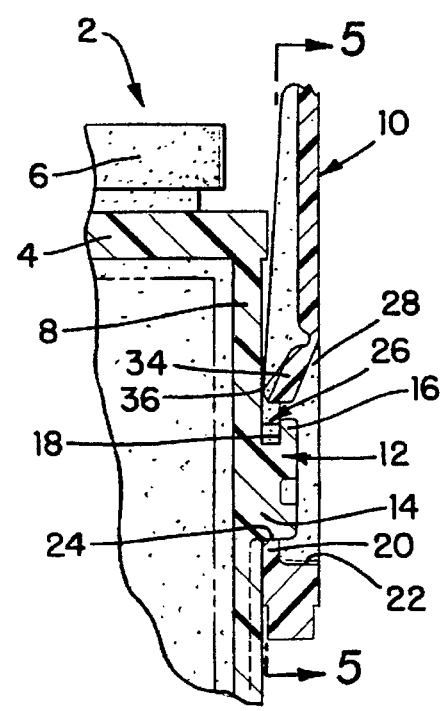
FIG. 4 is a view in the direction 4—4 of FIG. 3.

FIG. 1 depicts a terminal of a battery handle which is manufactured commercially by the assignee of the present invention, and which is described in detail in connection with FIGS. 16–20 of U.S. Pat. No. 4,673,625 supra which is incorporated herein by reference. In addition to the features described in U.S. Pat. No. 4,673,625, the commercial embodiment includes a tab A hinged along the joint which acts as a stop to prevent the knob from exiting the socket D until such time as the tab is pryed upwardly out of the way of knob C.

Figure 5:
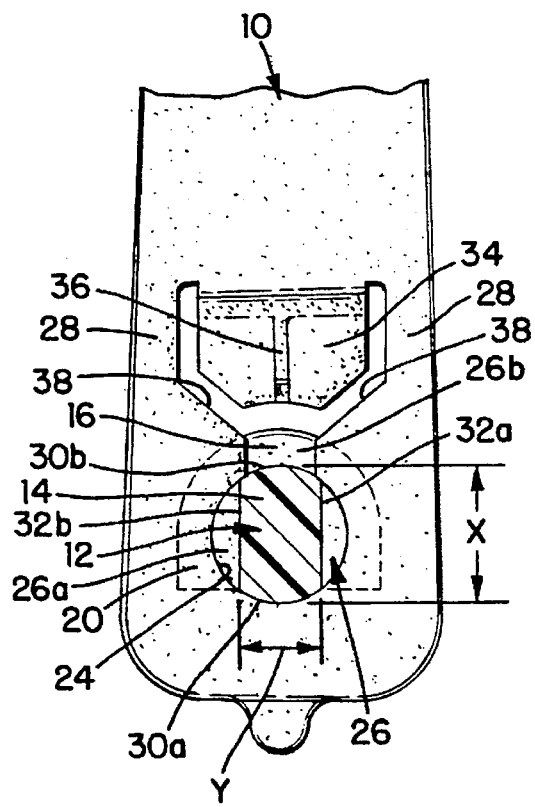
FIG. 5 is a view in the direction 5—5 of FIG. 3.
Figure 6:
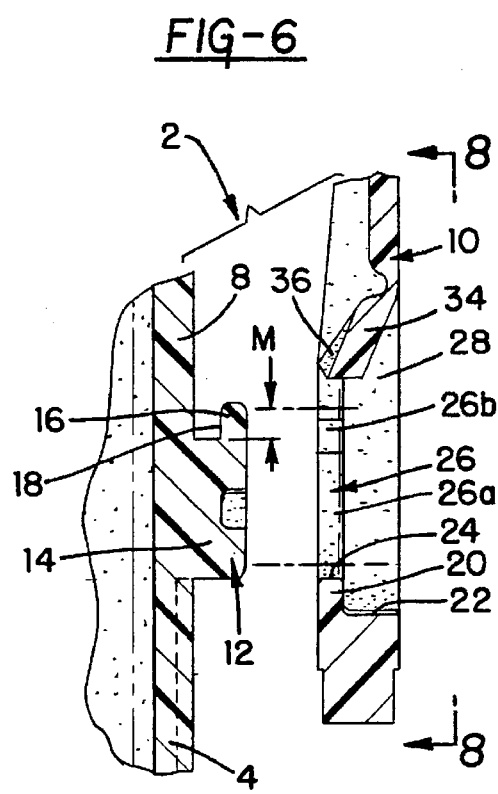
FIG. 6 is an exploded sectioned side view of the handle and knob.

FIGS. 2–8 depict a battery 2 comprising a container 4, having a cover 6 and an endwall 8 on each end of the container 4. A carrying handle 10 is attached to endwall 8 by means of a mounting knob 12 comprising a stem 14 and a flange 16 which extends radially outboard the stem 14. The other end of the handle is similarly attached to the other endwall. The flange 16 nests in a pocket 22 in the handle as will be described in more detail hereafter. The flange 16 has an inner surface 18 on the underside thereof for engaging the handle 10 to prevent the handle 10 from lateral disengagement from the battery container 4 (i.e., axially to the stem 14). The terminal on the ends of the handle 10 comprises a wall 20 defining a pocket 22 for receiving the flange 16 of the knob 12. As best shown in FIGS. 5 and 6, a rim 24 in the wall 20 defines a socket 26 receiving the stem 14 of the knob 12. The socket 26 comprises a stem-retaining portion 26a and a gate portion 26b for ingress and egress of the stem 14 into/out of the stem-retaining portion 26a of the socket 26. Rails 28 guide the knob 12 into place during attachment of the handle to the battery.

Figure 7:
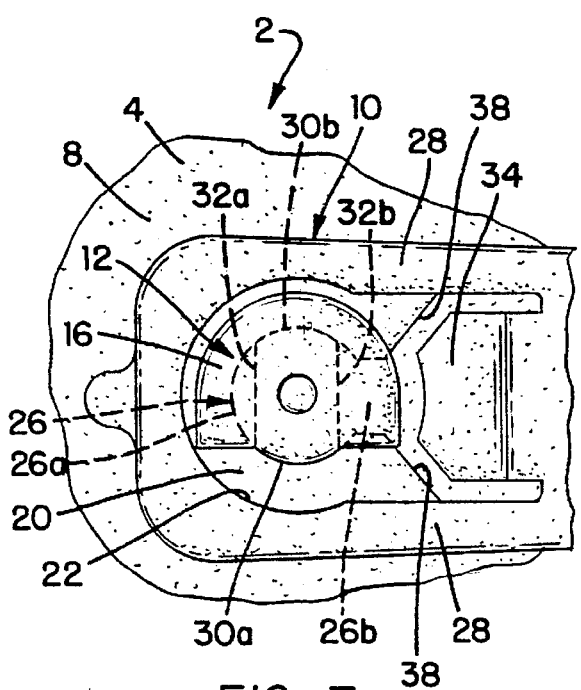
FIG. 7 is a view like that of FIG. 3 but with the handle rotated to the 3 o'clock position.
Figure 8:
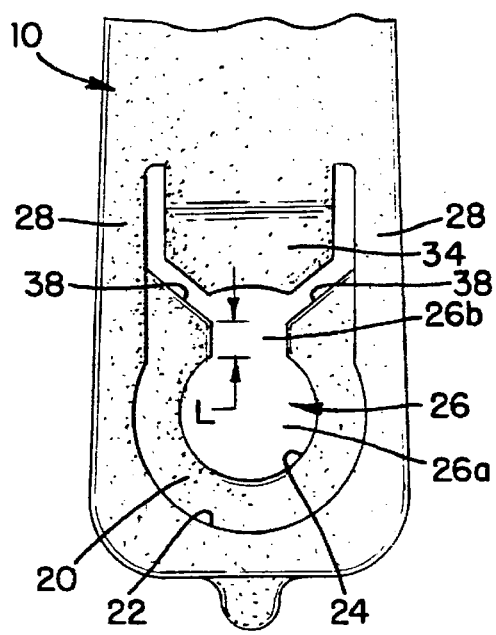
FIG. 8 is a view in the direction 8—8 of FIG. 6.

In accordance with the present invention, the stem 14 of the knob 12 will comprise a longitudinally bilaterally truncated cylinder having a pair of opposing arcuate faces 30a and 30b spaced apart by a first distance X and a pair of opposing flat faces 32a and 32b, at right angles to the arcuate faces 30a and 30b, and spaced apart from each other by a second distance Y which is less than said first distance X, and preferably at least about 25% less than said first distance X so that only a narrow gate portion 26b is needed in the terminal wall. The gate portion 26b of the socket 26 is an elongated slot which is slightly narrower than the second distance Y between the faces 32a and 32b, and has a length L which is at least about equal to the length M so that the flange 16 extends beyond the stem 14 for maximizing the extent of the interfering surfaces of the wall 20 and the flange 16 in the region of the gate 26b. As best shown in FIG. 7, the flange 16 extends around the stem 14 sufficiently to completely overlie the gate 26b throughout at least 180° of rotation of the handle 10 about the knob 12 from the 9 o'clock horizontal position (not shown) to the 3 o'clock (shown) horizontal positions. Hence, when the handle 10 is 90° from the vertical, the flange 16 is sufficiently large as to completely cover the gate slot 26b in the wall 20 and serves to resist pulling of the handle 10 off of the knob 12 in a direction perpendicular to the endwall 8. To this end, the flange 16 will preferably extend angularly around the stem 14 by at least about 240°. Narrower gates 26b would permit the use of a somewhat smaller circumference flange 16.

Manual removal of the handle 10 from the knob 12 is limited to the direction(s) where the gate 26b is aligned with the narrowest part of the stem 14, i.e., between the flat faces 32a and 32b. When so aligned, the narrow opening in the gate 26b will still allow the stem 14 to be forced therethrough. In all other orientations of the handle, the stem 14 is much wider than the width of the slot 26b and prevents removal of the stem 14 from the stem-retention zone 26a. To remove the handle, the slot 26b is aligned with the flat faces 32a and 32b, the locking tab 34 is pryed up (e.g., by a means of a screwdriver or the like) until it clears the flange 16, and the terminal pushed off of the knob 12 which causes the slot 26b to spread as the stem 14 moves therethrough. Hence where the flat faces 32a and 32b are oriented vertically, the terminal can only be removed from the knob 12 vertically e.g., by pushing downwardly on the terminal. A foot 36 molded onto the underside of the tab 34 prevents the tab 34 from dropping below the flange 16. Sloping surfaces 38 on the edge of the wall 20 serve to guide the stem 14 into alignment with the slot 26b during engagement of the handle 10 with the knob 12.

While the invention has been disclosed primarily in terms of certain specific embodiments thereof it is not intended to be limited thereto but rather only to the extent set forth hereafter in the claims which follow.

What is claimed is:

1. In an electric storage battery having a container and carrying handle pivotally and detachably connected to said container, a knob attached to each endwall of said container for engaging said handle, said knob comprising a stem and a flange extending radially outboard said stem spaced from said endwall, said flange having an inner surface on the stem side of said flange confronting said endwall, a terminal on each end of said handle engaging a said knob, said terminal comprising a wall defining a pocket containing said flange and engaging said inner surface so as to prevent axial displacement of said terminal with respect to said knob, a rim on said wall defining a socket in said wall receiving said stem portion, said socket having a stem-retention zone and a gate portion, said gate portion having an opening which is narrower than said stem for interference-fit ingress and egress of said stem into and out of said stem-retention zone so as to retain said stem in said zone in normal use yet permit manual removal of said handle, the improvement wherein said flange extends radially outboard said stem by a first length, said gate comprises an elongated slot in said wall having a second length at least about equal to said first length, said stem comprises a longitudinally bilaterally truncated cylinder having a pair of opposing arcuate faces spaced apart by a first distance and a pair of opposing flat faces spaced apart by a second distance which is less than said first distance and greater than said opening for an interference fit with said slot, and said flange extends around said stem sufficiently to substantially completely overlie said slot throughout at least about 180° of rotation of said handle about said knob.

2. An electric storage battery according to claim 1 wherein said flat faces are substantially vertical when the battery is in its upright position such that said handle can only be removed from the battery when the handle is substantially vertical thereto.

3. An electric storage battery according to claim 2 wherein said second distance is at least about 25% less than said first distance.

\* \* \* \* \*